United States Patent [19]
Yuyama et al.

[11] Patent Number: 5,640,613
[45] Date of Patent: Jun. 17, 1997

[54] CORRECTIVE LENS ASSEMBLY

[75] Inventors: Kazuhiko Yuyama, Kanagawa, Japan; Robert A. Howard, Mountain View; Albert Yan, Fremont, both of Calif.

[73] Assignee: Apple Computer, Inc., Cupertino, Calif.

[21] Appl. No.: 422,043

[22] Filed: Apr. 14, 1995

[51] Int. Cl.$^6$ .............. G03B 13/12; G03B 13/14
[52] U.S. Cl. .............. 396/71; 396/140; 396/296; 396/377; 396/544; 348/341
[58] Field of Search .............. 354/195.12, 199, 354/219, 221, 222, 295, 126, 195.13, 149.11; 356/21; 348/341, 334; 396/71, 140, 141, 296, 377, 544

[56] References Cited

U.S. PATENT DOCUMENTS

| | | | |
|---|---|---|---|
| 2,674,932 | 4/1954 | Tydings et al. | 354/295 |
| 3,253,528 | 5/1966 | Bing | 354/199 |
| 3,393,623 | 7/1968 | Gutmann et al. | 354/221 |
| 3,699,867 | 10/1972 | Wolbarst | 354/221 |
| 4,011,571 | 3/1977 | Okuzawa | 354/219 |
| 4,171,887 | 10/1979 | Hayata | 354/126 |
| 4,219,264 | 8/1980 | Rodeck | 354/295 |
| 4,341,449 | 7/1982 | Iwata et al. | 354/126 |
| 5,146,256 | 9/1992 | Frosig et al. | 354/295 |

OTHER PUBLICATIONS

Ace Optical Brochure (portions thereof showing snap-on corrective lens); 1993.

*Primary Examiner*—A. A. Mathews
*Attorney, Agent, or Firm*—Blakely, Sokoloff, Taylor & Zafman

[57] ABSTRACT

A lens assembly, image capturing device and a method for using a lens assembly with an image capturing device. The lens assembly comprises a first lens mounted on a holder which attaches the first lens to a viewing device of an image capturing device. A marking on the first lens is observable through the viewing device when the lens is attached to the viewing device such that the marking is capable of being used to position the lens assembly a properly focused distance from a target having a specified (predetermined) size. The relationship, as seen through the viewing device between the size of the object and the size of the marking may be used to properly position the camera relative to the target object.

20 Claims, 3 Drawing Sheets

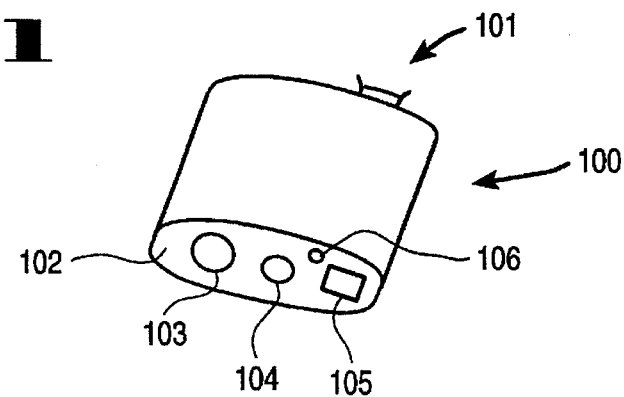
FIG_1
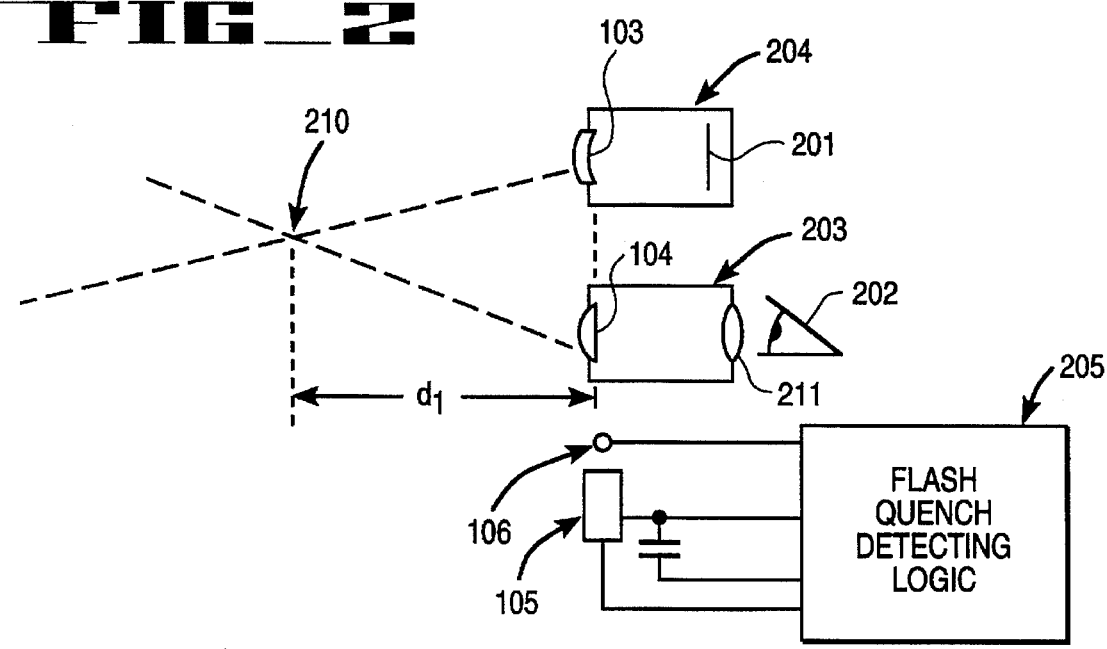
FIG_2
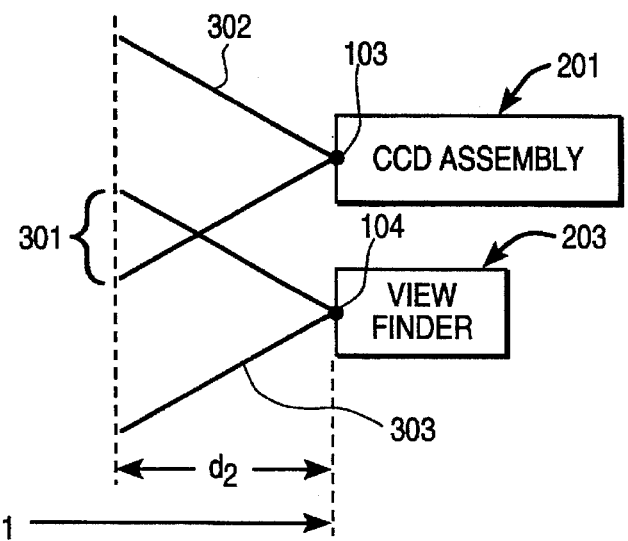
FIG_3

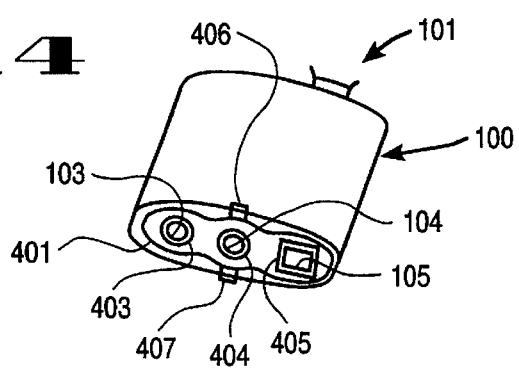
FIG_4
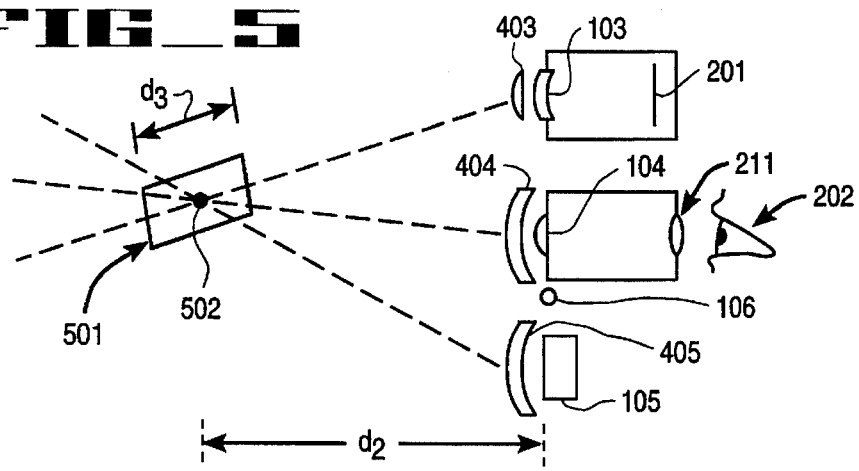
FIG_5
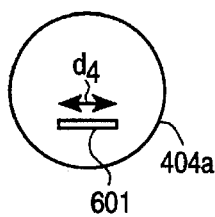
FIG 6A
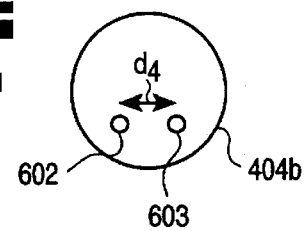
FIG 6B
FIG 6C
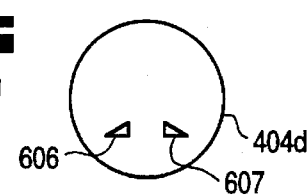
FIG 6D
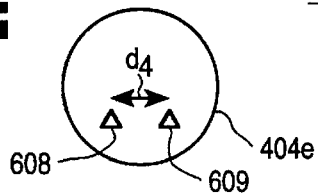
FIG 6E
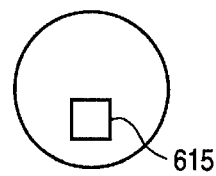
FIG 6F

FIG_7
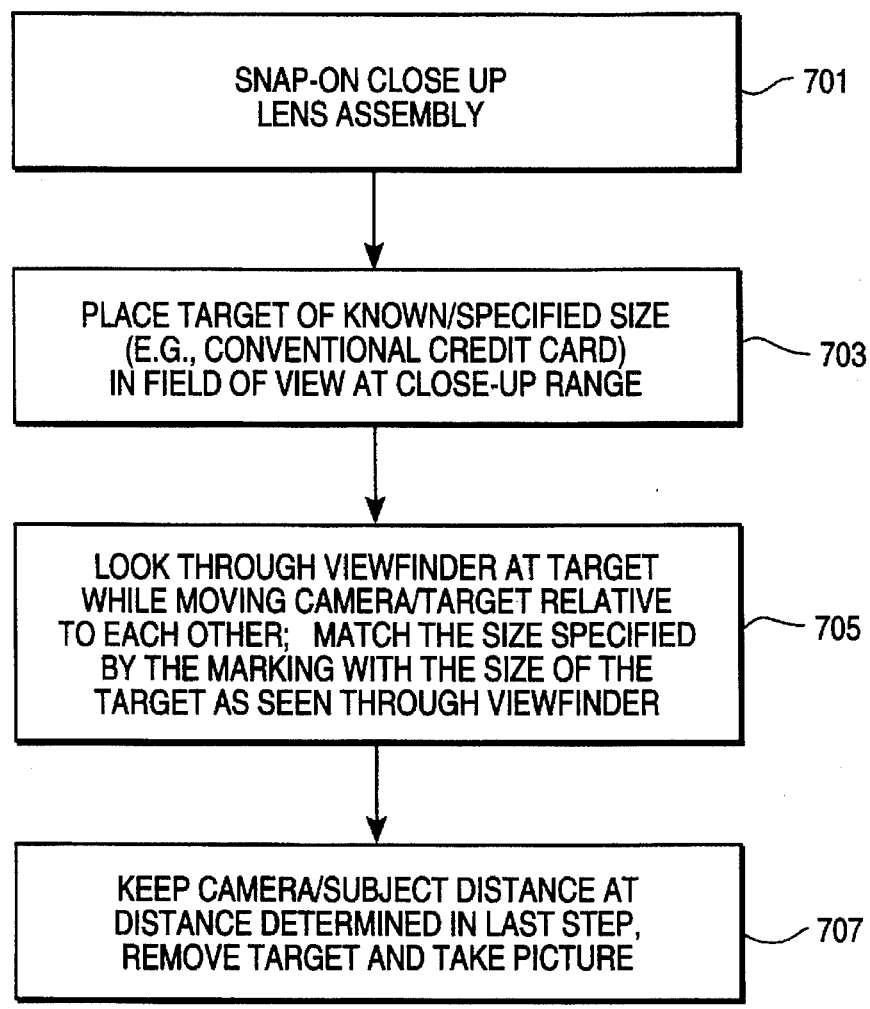
FIG_8
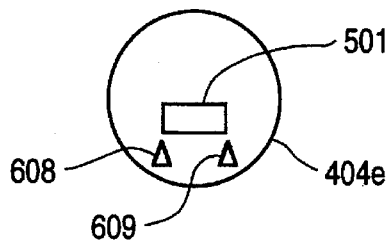
FIG_9
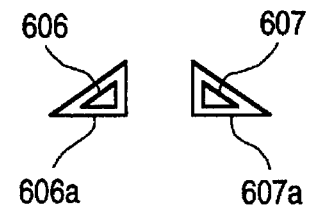

CORRECTIVE LENS ASSEMBLY

FIELD OF THE INVENTION

The present invention relates generally to optical systems and to image capturing devices utilizing optical systems.

BACKGROUND OF THE INVENTION

Image capturing devices, such as cameras using photographic film, video cameras using video tape, and digital cameras using an array of charge coupled devices in a semiconductor typically, all use some optical system to focus light from an object onto the image capturing medium, such as photographic film or an array of charge coupled devices (CCD). Various types of optical systems exist in the prior art. In each of these types, there is typically a view-finder which allows the photographer or user of the camera or other image capturing device to observe the view being recorded (or to be recorded) on the image capturing medium. Some of these view-finders see almost exactly the same field of view and frame of view as the image capturing medium; an example of this type of optical system is the classic single lens reflex camera. In this camera, a mirror behind the lens directs light from the image which comes through the lens to the viewing screen of the view-finder, and this mirror is removed during exposure of the film in order to allow light from the image to reach the film. Other types of image capturing devices such as view-finder cameras have one lens system to direct the light from the image to the image capturing medium and another lens system (e.g. the view-finder) to provide a view for the user of the camera. In these view-finder systems, the view displayed in the view-finder does not exactly match the view appearing on the image capture medium, such as the photographic film or CCD. This results from an effect known as parallax.

FIG. 1 shows an example in the prior art of a fixed focus view finder camera 100. View finder camera 100 is a digital camera, an embodiment of which is known as the QuickTake 100 camera from Apple Computer, Inc. of Cupertino, Calif. The front 102 of this camera includes a primary lens 103 which focuses light from a subject onto the CCD image capture medium. The camera 100 also includes a view-finder lens 104 which focuses light from the subject into the view-finder so that the camera user's eye can focus upon the image/subject being viewed. The camera 100 also includes a light source 105, which is typically a flash which is controlled by a sensor 106 which monitors the amount of the flash being produced to illuminate the subject being recorded.

FIG. 2 illustrates the optical system of the camera 100. The optical system is designed such that, with a fixed focus camera, all objects from approximately 1.1 meters to infinity from the camera are in focus. This distance of 1.1 meters is shown as $d_1$. As can been seen from FIG. 2, an optical parallax occurs by virtue of the fact that the view-finder 203 is physically displaced away from the primary lens 103 and the image capturing medium 201, such as CCD or photographic film. This physical displacement causes the view through the view-finder to not exactly match the view of the image appearing on the image capturing medium 201. This may be seen from FIG. 3, which shows two view cones 302 and 303; one cone 302 extends from the primary lens and the other cone 303 extends from the view-finder lens 104. The optical axis (also know as center axis) of each lens bisects the view cone which extends from the lens. The distance at which the optical axis of the view-finder lens intersects the optical axis of the primary lens is about 2 meters from the camera. At this distance, the views (frame) of the primary lens and the view-finder substantially coincide. At large distances (e.g. 10 meters) away from the camera, the parallax problem is not significant due to the convergence at $d_1$ of the view cones 302 and 303 shown in FIG. 3. Thus, at large distances the eye 202 of the user looking through the view finder 203 (which includes a view finder lens 104 and a view finder lens 211) sees the image in substantially the same field as is imaged upon the image capturing medium 201.

However, at short distances between the subject being photographed and the camera, the parallax problem becomes significant such that the overlap 301 of the view cones 302 and 303 is not sufficient. This can be seen in FIG. 3 when the camera is being used in a "close-up" view where the distance $d_2$ is considerably smaller than the distance $d_1$. In the example shown in FIG. 3, $d_2$ may be, for example, one foot while $d_1$, which represents the minimum distance at which objects are in focus may be, for example, about 4 feet. At a close-up range the camera has several deficiencies which must be corrected. The use of fixed focus view-finder cameras in close-up work has always been difficult due the parallax problem and also due to the lack of focus control. Typically, these types of cameras cannot focus this close and thus the image will always be out of focus unless the optics are adjusted. The corrective optics must also take into account the severe parallax problem at such short distances, such as one foot between the subject being recorded and the camera. A corrective optic element must be placed in front of the primary lens 103 in order to focus the image at a close-up range, such as at $d_2$, upon the image capturing medium 201. Also, a corrective optic element, such as an optical lens must placed in front of the view-finder lens 104 in order to allow the subject at $d_2$ to appear properly framed to the eye 202 of the user. That is, the parallax problem at short distances between the view-finder and the primary lens is corrected with the corrective lens which is placed in front of the lens 104. Also, it is often necessary to redirect, attenuate and diffuse the light from the flash unit 105 so that the subject in the close-up range at $d_2$ is not illuminated with too much light or light that has "hot spots" which are brighter than other spots on the subject.

The prior art includes a lens assembly (or lens adapter) which is attached to a camera to convert a fixed focus view finder camera into a close-up range camera. For example, Ace Optical of Japan has provided lens assemblies containing a corrective lens for the primary lens of the camera as well as a corrective lens for the view-finder lens of the camera. This lens assembly then allows the camera to be used at a close-up range by modifying the field of view through the view finder and the focus through the primary lens.

These corrective lens assemblies by themselves do not, however, correct for another problem which occurs when using such a camera at short close-up ranges. This problem, depth of field, means that the positioning of the camera relative to the subject being recorded is critical in order to ensure that the subject is properly in focus. At close-up ranges, an optically corrected fixed focus camera tends to have a very small depth of field; typically, this depth of field is about 2 inches, meaning that only those objects within 1 inch of the correct focusing distance will be in focus. Because the eye, viewing the image through the view-finder, cannot ascertain whether the image is focused on the image capturing medium, it becomes impossible for the user of such a camera with a corrective lens assembly to accurately judge when the image is focused at a close-up range on the image capturing medium. One solution in the prior art includes using a measuring stick or a measuring string which extends from the front (or other portion) of the camera or from devices attached to the camera and is designed in length to measure exactly the distance where the image will be in focus. So, for example, the camera shown in FIG. 2 or in FIG. 1 may be fitted with the corrective lens assembly for allowing the camera to be used at close-up range, and this corrective lens assembly may include a string having a defined length so that the user may place the camera relative to the subject to be photographed at the proper distance such that the subject is focused on the image capturing medium 201.

While this solution to the depth of field problem is adequate in some circumstances, it is desirable to provide an improved solution which does not require the user to carry around a measuring device.

SUMMARY OF THE INVENTION

The present invention provides a lens assembly which comprises a first lens mounted on a holder. The holder attaches the first lens to a viewing device of an image capturing device. A marking on the first lens is observable through the viewing device, such as a view-finder, when the lens is attached to the viewing device. The marking is capable of being used to position the lens assembly and the camera approximately a correct focusing distance from a target object in a close-up focusing range which is provided when the lens assembly is attached to the camera. The target object which is placed into the viewing field (typically with the photographic subject) has a known, predetermined size which has a relationship to the size of the marking. The relationship of the two sizes, as seen through the viewing device, such as view finder, determines the proper focusing distance. In one embodiment, the marking comprises a pair of isosceles triangles spaced apart by a known distance, and this spacing is matched to the size of the known target object, typically a business card (or a credit card) as seen through the view-finder.

The present invention also provides for a method for using the lens assembly with an image capturing device. The method includes viewing a target object through a viewing device, such as a view-finder, where the viewing device is optically coupled to a first lens of the lens assembly. The user matches a marking, which appears in a view through the viewing device relative to the target object. The marking has a first size and the target object has a second size. The step of matching the marking to the target object as viewed through the viewing device causes the image capturing device to be positioned approximately a first distance from the target object, which first distance is the proper focusing distance for the image capturing device with the corrective lens assembly attached thereto. Typically, there is a small depth of field at the close-up range such that there is a margin of error in positioning the camera relative to the subject to be photographed or otherwise recorded. This margin of error is defined by this small depth of field, and any distance approximately within the margin of error around the first distance is approximately the first distance.

The image capturing device of the present invention includes a primary lens which is optically coupled to an image capturing medium, such as a CCD. Also included with the device is a viewing lens which is part of the view-finder system of the image capturing device. A first corrective lens is optically coupled to the primary lens to refocus the image on the image capturing medium such that images appearing in a close-up range are in focus on the medium. A second corrective lens which is optically coupled to the viewing lens reframes the view through the view-finder such that the field of view of the view-finder and the primary lens substantially coincide at a close-up range.

BRIEF DESCRIPTION OF THE DRAWINGS

The following figures illustrate various aspects of the invention, and like reference numerals are used in the figures to illustrate the same or similar elements.

FIG. 1 shows a prior art fixed focus view finder digital camera.

FIG. 2 shows the optical system of a prior art fixed focus digital camera.

FIG. 3 shows the parallax problem of a fixed focus camera which is being focused upon an image close to the camera.

FIG. 4 shows a camera of the present invention having a corrective lens assembly which is snapped on to the front of the camera.

FIG. 5 shows the optical system of a camera illustrated in FIG. 4.

FIGS. 6a, 6b, 6c, 6d, 6e, and 6f show various markings which appear in the view through the view finder of the camera of the present invention.

FIG. 7 shows a flow chart illustrating a method of the present invention.

FIG. 8 shows an example of matching a marking to a known object in order to properly position the camera relative to the object so that the object is properly focused upon the image capturing medium.

FIG. 9 illustrates an example of a marking on the view finder lens and the visual perception of the marking.

DETAILED DESCRIPTION OF THE PRESENT INVENTION

In the following specification, numerous examples of lens assemblies, lens elements, markings and parameters, including distances, are described and shown in order to provide a detailed description of the present invention. It will be appreciated that these details are given as examples of the invention and should not be taken to limit the scope of the invention.

The lens assembly 401 of the present invention is placed onto the digital camera 100 as shown in FIG. 4. In one embodiment, this lens assembly snaps into groves on the front of the camera; brackets 406 and 407 contain lips which snap into the groves allowing the lens assembly 401 to be securely attached to the front of the camera 100. The lens assembly 401 includes a corrective lens 403 which is optically coupled to primary lens 103. Without the lens 403, primary lens 103 cannot focus a subject closer than about 4 feet. Lens 403, in combination with lens 103 causes an image at a close-up range to be properly focused onto the image capturing medium 201, which is a CCD in the preferred embodiment. The close-up range in the preferred embodiment is about 1 foot, with a depth of field of about 2 inches. The corrective lens assembly 401 also includes a lens 404 which corrects the view of lens 104 to allow the user's eye 202 to properly view, with parallax correction, an image appearing at a close-up range in front of the camera. Without the lens 404, the view of the lens 104 would only minimally coincide, as shown in FIG. 3, with the view of lens 103. The corrective lens assembly 401 also includes a lens 405 which attenuates the light from the flash 105 and also corrects for parallax effects at a close-up range such as $d_2$.

In one embodiment, lenses 404 and 405 are fresnel prism lenses. Examples of other corrective lenses to allow a fixed focus camera to perform close-up photography have been produced by Ace Optical as noted above. However, in the examples of the prior art, the small depth of field has always presented a problem for the user who is to attempting to find the correct distance between the subject and the camera in order to focus the subject-image onto the image capturing medium. In the past, this problem has been solved by using a string or other measuring stick (e.g. of length $d_2$ which is known to be the correct focusing distance at a close-up range) to properly measure the correct focusing distance between the subject and the camera at a close-up range.

According to the present invention, a marking is provided on the viewing corrective lens 404. This marking is used with a target 501 having a known size. This size of the target 501, as viewed through the viewing device by the user's eye 202, may be matched up with the marking on the lens 404. The relationship between the size of the marking and the size of the target as seen through the view-finder will determine whether the camera is properly positioned relative to the target such that the target is in focus. Typically, the target is placed onto or with the subject being recorded. In one embodiment, when the size of the target as seen through the viewing device matches the size of the marking as seen through the viewing device, then the camera is properly positioned in front of the target such that the subject is in focus on the image capturing medium.

FIGS. 6a, 6b, 6b, 6c, 6d, 6e and 6f show various markings which may be placed on the lens 404 and which may be used, in conjunction with a target 501 having a known size relative to the marking, to properly position the camera relative to the subject being recorded such that the image of the subject on the image capturing medium 201 is in focus. As shown in FIG. 6a, the marking may be a bar 601 which is visible through the view-finder. This bar 601 may be a translucent bar having a length $d_4$ and placed onto the lens 404, such as lens 404a. Alternatively, the marking may be circles 602 and 603 being spaced apart by the distance $d_4$. This distance $d_4$, which is also shown in FIG. 6a, is related to the distance $d_3$ which is a physical dimension (size) of the target 501. In one embodiment, the distance $d_4$ which is specified by the marking may be 4.5 mm while the distance $d_3$ may be about 85 mm. FIG. 6c shows two polygons 604 and 605 which may comprise the marking; in this instance, the polygons are rectangles or squares and the distance between the two polygons is also $d_4$. These markings may be placed directly onto the corrective lens 404 as translucent markings and hence will appear as translucent rectangular patches through the view-finder. Another example of a marking is shown in FIG. 6d which utilizes two triangles 607 and 606 on the corrective lens 404d. In the preferred embodiment, isosceles triangles 608 and 609 shown in FIG. 6e are used as the marking on the corrective lens 404, such as lens 404e. This corrective lens 404e is placed in front of the view-finder lens 104 in order to correct the parallax of the view-finder relative to the primary lens. The isosceles triangles 608 and 609 may be translucent. The two sides of each triangle which are identical form a vertex. As shown in FIG. 6e, each such vertex points up and specifies a length shown as $d_4$. Another possible marking is shown in FIG. 6f; this marking is a rectangular outline which, when the camera is properly positioned relative to the target, the rectangular outline of the marking coincides with the rectangular outline of the target (e.g. a credit card).

The size $d_4$ which is specified by the marking, such as isosceles triangles 608 and 609, is determined relative to the size $d_3$ of the target 501 which has a known size. As noted in one embodiment, the target 501 is a standard credit card having a length of 85 mm, where $d_3 = 85$ mm, and the distance $d_4$ between the upwardly pointing vertices of the isosceles triangles 608 and 609 on the lens 404 is about 4.5 mm. It will be appreciated that the distance $d_4$ is the actual physical distance of the marking on the corrective lens 404. Thus, for example, the vertices between the identical sides of the isosceles triangle 608 and 609 are separated by the distance $d_4$ as shown in FIG. 6e. Similarly, if the marking is the bar 601, the length of the bar on the lens 404 will be about 4.5 mm.

This length $d_4$ may be determined empirically by placing dots of different colors (or a numbered scale) along a row on the lens 404 and placing the known target (e.g. a credit card or a business card) 501 at the known, correct focusing distance between the object 501 and the camera and then by viewing the target 501 through the view-finder and determining which dots line up with the edges of the target 501 as seen through the view finder. The dots which line up specify the correct size of the marking since the target 501 was placed at the known, correct focusing distance at close-up range (e.g. by using the measuring string from the prior art). The relationship between $d_3$ and $d_4$ is determined by three factors: 1) the distance the close-up system is designed to focus at; 2) the magnification factor of the view-finder; 3) the distance between the corrective view-finder lens 404 and the view-finder lens 104.

The method of the present invention will now be described while referring to FIG. 7. The close-up lens assembly is snapped onto the front of the camera as shown in step 701. Then in step 703, a target object of known size, such as a conventional credit card, is placed in front of the camera in the close-up field of view beside or on the photographic subject. In one embodiment, this close-up field of view is at approximately 1 foot from the front of the camera rather than the typical 4 feet and beyond range for focusing. The user then, in step 705, looks through the view-finder at the target while moving the camera/target relative to each other. For example, if the subject and target may be kept stationary, the camera may be moved; otherwise, the camera may be kept stationary and the target and subject moved. The user then attempts to match the size specified by the marking on the corrective lens 404 with the size of the target 501 as seen through the view-finder. This is shown in FIG. 8. In particular, the size of the target 501 is caused to match the size specified by the vertices of the triangle 608 and 609 such that the sizes are substantially identical. This occurs by moving the camera and target relative to each other until the size of the target 501 as seen through the view finder matches the size specified by the marking. Then, the camera/subject distance are kept at the distance determined by the matching step shown in FIG. 8 and the image of the subject is recorded by taking a picture of the subject. In this manner, it is possible to position the camera relative to the subject and properly focus the subject even with such small depth of fields as two inches without having to use a cumbersome string or other measuring stick.

The use of isosceles triangles as the marking of the present invention provides advantages over other types of markings. As shown in FIG. 9, two triangles 607 and 606 which are not isosceles triangles may be used as markings. However, because these markings are placed directly onto the lens 404, the eye cannot focus them precisely. As a result, the multiple blurry images of the triangles produced from one triangle on the lens are averaged into a respective triangle which cimumscribes the actual triangle on the lens.

As shown in FIG. 9, the actual physical triangles 606 and 607 are viewed by the user, due to this effect, as triangles 606a and 607a. It can be seen from FIG. 9 that the distance between the apparent outlines of triangles 606a and 607a is different than that distance between triangles 606 and 607. Consequently, the error resulting from the averaging of the various blurry triangles into a single triangle results in an error in positioning the camera relative to the object which causes the image to be out of focus given the short depth of field at a close-up range. This effect does not occur with isosceles triangles since the multiple blurry images of the isosceles triangles tend to be centered upon the actual isosceles triangle positioned on the lens 404.

While the foregoing invention has been described with reference to various lens configurations, optical systems and markings, it will be appreciated that numerous modifications may be made within the spirit of the present invention which is defined by the following claims.

We claim:

1. A lens assembly comprising:
    a first lens mounted on a holder, said holder for attaching said first lens to a viewing device of an image capturing device;
    a marking on said first lens, said marking having a first size and being observable through said viewing device when attached to said viewing device such that said marking is capable of being used to position said lens assembly a first distance from a first object having a predetermined second size, wherein a relationship, seen through said viewing device, between said first size and said second size determines said first distance.

2. A lens assembly as in claim 1 wherein said viewing device comprises a viewfinder having a second lens and wherein said lens assembly further comprises:
    a third lens mounted on said holder, said third lens modifying an optical path of light from said object, said third lens for being attached in optical communication with a fourth lens, wherein said fourth lens is in optical communication with an image capturing medium in said image capturing device.

3. A lens assembly as in claim 2 further comprising;
    a fifth lens mounted on said holder, said fifth lens for modifying illumination from a light source.

4. A lens assembly as in claim 3 wherein said image capturing device is a camera and said image capturing medium comprises one of a semiconductor array and photographic film and wherein said marking is one of a bar, a pair of circles, a geometric outline or a pair of polygons.

5. A lens assembly as in claim 1 wherein said first lens provides a close-up view through said viewing device, and wherein said marking comprises two isosceles triangles having two vertices which specify said first size.

6. A lens assembly as in claim 2 wherein said first lens provides a close-up view through said viewing device and said third lens provides a close-up view upon said image capturing medium, and wherein said image capturing device is a fixed focus camera.

7. A method for using a lens assembly with an image capturing device, said method comprising:
    viewing a first object through a viewing device, said viewing device being optically coupled to a first lens of said lens assembly;
    matching a marking, which appears in a view through said viewing device, relative to said first object, said marking having a first size and said first object having a predetermined second size, wherein said step of matching causes said image capturing device to be positioned a first distance from said first object.

8. A method as in claim 7 wherein a relationship between said first size and said second size determines said first distance.

9. A method as in claim 7 wherein said image capturing device is positioned approximately said first distance from said first object within a range determined by a depth of field of said image capturing device.

10. A method as in claim 9 further comprising:
    placing said lens assembly on said image capturing device;
    moving one of said image capturing device and said first object relative to each other while viewing said first object through said viewing device.

11. A method as in claim 10 wherein said step of moving is performed while performing said step of matching.

12. A method as in claim 8 wherein said marking comprises two isosceles triangles having two vertices which specify said first size.

13. A method as in claim 8 wherein said lens assembly comprises said first lens and a second lens, and wherein said image capturing device comprises said viewing device having a third lens and comprises a fourth lens which is optically coupled to an image capturing medium, and wherein said first lens and said third lens are optically coupled and wherein said second lens and said fourth lens are optically coupled.

14. An image capturing device comprising:
    a primary lens optically coupled to an image capturing medium;
    a viewing lens optically coupled to a viewing device;
    a first corrective lens optically coupled to said primary lens;
    a second corrective lens optically coupled to said viewing lens, said second corrective lens having a marking which is observable through said viewing device such that said marking is capable of being used to position said image capturing device a first distance from a first object, said marking having a first size and said first object having a predetermined second size such that a relationship, as seen through said viewing device, between said first size and said second size determines said first distance.

15. An image capturing device as in claim 14 wherein said marking is selected from the group of a bar, a pair of circles, a geometric outline, or a pair of polygons.

16. An image capturing device as in claim 14 wherein said marking comprises a pair of isosceles triangles having a first isosceles triangle, the two equal sides of which form a first vertex, and a second triangle, the two equal sides of which form a second vertex, and wherein the distance between said first vertex and said second vertex determines said first size.

17. An image capturing device as in claim 14 further comprising:
    a light source and a third corrective lens optically coupled to said light source.

18. An image capturing device as in claim 14 wherein said image capturing device is a camera and wherein said image capturing medium comprises one of a semiconductor charge coupled device array and photographic film, and wherein said camera has a fixed focus.

19. An image capturing device as in claim 14 wherein said image capturing device is positioned approximately said first distance within a range determined by a depth of field of said image capturing device.

20. An image capturing device as in claim 14 wherein said first corrective lens provides a focused close-field view upon said image capturing medium and said second corrective lens provides a focused close-field view through said viewing device.

* * * * *

UNITED STATES PATENT AND TRADEMARK OFFICE
CERTIFICATE OF CORRECTION

PATENT NO. : 5,640,613
DATED : June 17, 1997
INVENTOR(S) : Yuyama et al.

It is certified that error appears in the above-identified patent and that said Letters Patent is hereby corrected as shown below:

In column 6 at line 67 delete "cimumscribes" and insert --circumscribes--

Signed and Sealed this

Sixteenth Day of December, 1997

BRUCE LEHMAN

*Attest:*

*Attesting Officer*      Commissioner of Patents and Trademarks